(12) United States Patent
Oroskar et al.

(10) Patent No.: US 9,629,034 B1
(45) Date of Patent: Apr. 18, 2017

(54) DYNAMIC SETUP OF FALLBACK COMMUNICATIONS DURING HANDOVER

(71) Applicant: Sprint Spectrum L.P., Overland Park, KS (US)

(72) Inventors: Siddharth S. Oroskar, Overland Park, KS (US); Maulik K. Shah, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 525 days.

(21) Appl. No.: 14/089,029

(22) Filed: Nov. 25, 2013

(51) Int. Cl.
*H04W 36/00* (2009.01)
*H04W 36/14* (2009.01)
*H04W 76/02* (2009.01)

(52) U.S. Cl.
CPC ....... *H04W 36/0022* (2013.01); *H04W 36/14* (2013.01); *H04W 76/026* (2013.01)

(58) Field of Classification Search
CPC ..... H04W 36/08; H04W 48/18; H04W 76/02; H04W 76/026; H04W 36/0022; H04W 36/14
USPC .................................................. 455/436–444
See application file for complete search history.

(56) References Cited

U.S. PATENT DOCUMENTS

| 2010/0315967 | A1* | 12/2010 | Patel | H04B 1/707 370/252 |
| 2011/0103277 | A1* | 5/2011 | Watfa | H04W 36/0022 370/310 |
| 2011/0216645 | A1* | 9/2011 | Song | H04W 36/0022 370/216 |
| 2013/0072182 | A1* | 3/2013 | Jung | H04W 24/10 455/422.1 |
| 2014/0044023 | A1* | 2/2014 | Kazmi | H04W 28/18 370/278 |

* cited by examiner

*Primary Examiner* — Thai Vu

(57) ABSTRACT

A method and system to help avoid a failed eCSFB call setup in the presence of handover. While a WCD is being served by a base station of a first network, the base station may detect both a fallback trigger and a handover trigger. The fallback trigger may be a trigger to initiate a fallback setup procedure, where the fallback setup procedure involves execution of a sequence of steps including a particular step. The handover trigger may be a trigger to initiate a handover procedure. The base station determines that the handover trigger was detected before execution of the particular step of the fallback setup procedure. Responsive to determining that the handover trigger was detected before execution of the particular step, the base station (a) foregoes the fallback setup procedure and (b) transmits to the WCD a message directing the WCD to establish communication with the second network.

20 Claims, 7 Drawing Sheets

DYNAMIC SETUP OF FALLBACK COMMUNICATIONS DURING HANDOVER

BACKGROUND

A cellular wireless network may include a number of base stations that radiate to define wireless coverage areas, such as cells and cell sectors, in which wireless communication devices (WCDs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a WCD within coverage of the network may engage in wireless communication with a base station and may thereby communicate via the base station with various remote network entities or with other WCDs served by the base station.

In general, a cellular wireless network may operate in accordance with a particular air interface protocol or "radio access technology," with communications from the base stations to WCDs defining a downlink or forward link and communications from the WCDs to the base stations defining an uplink or reverse link. Examples of existing air interface protocols include, without limitation, Code Division Multiple Access (CDMA) (e.g., 1xRTT and 1xEV-DO), Long Term Evolution (LTE), WiMAX, iDEN, TDMA, AMPS, Global System for Mobile Communications (GSM), GPRS, UMTS, EDGE, MMDS, WI-FI, and BLUETOOTH, among other examples. Each protocol may define its own procedures for various functions related to air interface communication including, as just a few examples, registration of WCDs, initiation of communications, and handover of WCDs between coverage areas.

OVERVIEW

In communication systems that provide service under more than one air interface protocol, service providers may implement functionality that allows WCDs to operate on one air interface protocol and to dynamically switch over to operate on another air interface protocol to engage in certain communications. By way of example, in a system that supports both LTE service for mobile broadband and another protocol such as CDMA or GSM for traditional voice calls, service providers may implement "circuit switched fallback" (CSFB) functionality, which allows WCDs to operate by default on LTE and to switch over to operate on CDMA or GSM to engage in voice calls. Further, service providers may implement "enhanced circuit switched fallback" (eCSFB) functionality to make use of certain additional functions that support transition of a WCD from operating on one network to another. The example method described herein, or aspects thereof, may be carried out using CSFB functionality and/or eCSFB functionality, as will be readily understood by one of skill in the art. While reference may be made to "eCSFB" functionality in the disclosure herein, it should be understood that the disclosure may equally apply to "CSFB" as well.

Under eCSFB, a hybrid CDMA/LTE WCD may be arranged by default to scan for and register with an LTE network and to operate with its CDMA radio powered off, and then engage in control signaling with the CDMA network via the LTE network over the LTE air interface. To facilitate this, when the WCD registers with the LTE network, LTE network infrastructure such as a mobility management entity (MME) may signal through a network node such as an interworking server (IWS) with the CDMA network to register the WCD with the CDMA network.

In turn, when the CDMA network has a voice call to connect to the WCD, the CDMA network may signal through the IWS to the LTE network to cause the LTE network to send an eCSFB page message to the WCD over the LTE air interface. And upon receipt of that eCSFB page message, the WCD may responsively turn on its CDMA radio and tune to the CDMA network according to a predetermined call setup procedure to then engage in the call over the CDMA air interface.

The particular call setup procedure used to set up the eCSFB call over the CDMA air interface may take various forms. In some implementations the call setup procedure may involve the LTE network providing the WCD with some information for use in communicating with the CDMA network, before the WCD tunes to the CDMA network and begins to engage in such communications with the CDMA network. For instance, the LTE network may provide the WCD with a particular carrier and/or a particular traffic channel for use under the CDMA air interface. The particular carrier and/or particular traffic channel of the CDMA air interface may be provided to the LTE network by the CDMA network itself, perhaps by way of an IWS, as part of the eCSFB call setup procedure.

To facilitate identification of the particular carrier and/or particular traffic channel of the CDMA air interface, in some implementations, the LTE network may cause the WCD to measure the air-interface quality of various carriers and/or traffic channels provided by the CDMA network. The WCD may provide the LTE network with an indication of the air-interface quality measurements, and the LTE network may then send to the CDMA network the indication of the air-interface quality measurements. In turn, the CDMA network may use the air-interface quality measurements to identify a particular carrier and/or a particular traffic channel for use by the WCD for the eCSFB call. The CDMA network may then provide the LTE network with the identified particular carrier and/or particular traffic channel, so that the LTE network may pass along that information to the WCD to use in setting up the eCSFB call with the CDMA network.

Other examples of call setup procedures and aspects thereof may exist.

As described above, in order for the LTE network to provide the WCD with particular carrier and/or particular traffic channel information in accordance with some eCSFB call setup procedures, the LTE network may engage in various signaling with the WCD and/or the CDMA network to identify the particular carrier and particular traffic channel to be used, among other information. However such signaling involved in setting up the eCSFB call may be interrupted or otherwise disrupted if, during setup of the eCSFB call via a first base station of the LTE network, the WCD initiates a handover procedure to handover from being served by the first base station to be served by a second base station. This is because the WCD may cease communication with the first base station as part of the handover procedure. For instance, if the WCD initiates a handover procedure before the WCD is provided by the first base station the information to establish the eCSFB call under a given eCSFB call setup procedure, it may become inefficient, difficult, or impossible to provide the WCD with such information. As a result, setup of the eCSFB call may fail.

Disclosed herein, however, is a method and corresponding apparatus to help avoid a failed eCSFB call setup in the presence of handover.

According to the method, while a given WCD is being served by a base station of a first network (e.g. an LTE RAN), the base station of the first network may detect both a fallback trigger and a handover trigger. The fallback trigger may be a trigger to initiate a fallback setup procedure for setting up a fallback communication path for the WCD to be served by a second network, where the fallback setup procedure involves execution of a sequence of steps including a particular step. The handover trigger may be a trigger to initiate a handover procedure for the WCD. Then, according to the method, the base station of the first network determines that the handover trigger was detected before execution of the particular step of the fallback setup procedure. Then, responsive to determining that the handover trigger was detected before execution of the particular step, the base station of the first network (a) forgoes the fallback setup procedure and (b) transmits to the WCD a message directing the WCD to establish communication with the second network.

Thus, according to the method, the base station of the first network may help avoid a failure of setup of the eCSFB call, despite the presence of handover, by forgoing the fallback setup procedure and causing the WCD to proceed to communicate directly with the second network. The WCD may thereby potentially establish the eCSFB call via direct communication with the second network, without the base station of the first network carrying out the additional steps of the fallback procedure.

As a general matter, the handover trigger may be detected after the fallback setup procedure has been initiated or before the fallback setup procedure has been initiated. In the case where the handover trigger is detected after the fallback setup procedure has been initiated, the fallback setup procedure may be terminated (i.e., no step of the fallback setup procedure may be executed after receipt of the handover trigger). On the other hand, where the handover trigger is detected before the fallback setup procedure has been initiated, the fallback setup procedure may not be initiated at all.

As will be discussed further below, the particular step of the fallback setup procedure used to determine whether the fallback setup procedure will be terminated upon receipt of the handover trigger may be any suitable step of the fallback setup procedure. And the particular step may vary depending on the fallback setup procedure that is implemented.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

Figure 1:
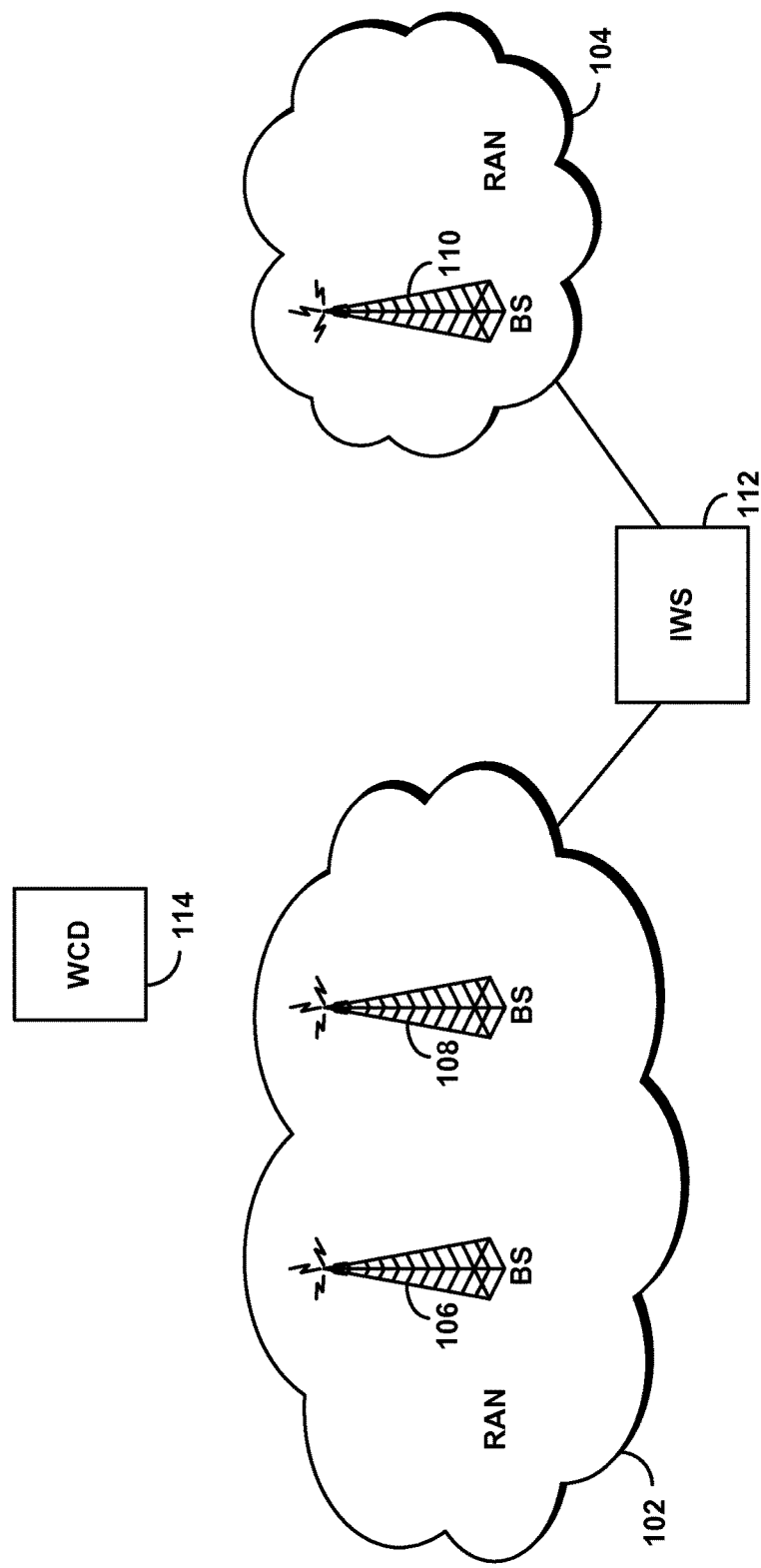
FIG. 1 is a simplified block diagram of a network arrangement in which an example embodiment of the present method and apparatus can be implemented.

FIG. 1 is a simplified block diagram of a network arrangement in which an exemplary embodiment of the present method and apparatus can be implemented. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location.

The arrangement of FIG. 1 includes by way of example multiple representative radio access networks (RANs) 102 and 104, each of which may function to provide wireless communication devices (WCD(s)), such as WCD 114, with air interface coverage and connectivity with one or more transport networks such as the PSTN and the Internet. As shown, RAN 102 includes two representative base stations (BSs), BS 106 and BS 108 that each radiate to provide respective coverage areas defining respective air interfaces through which to exchange control and bearer data with WCD(s). Similarly, RAN 104 includes a representative BS 110 that radiates to provide a respective coverage area defining an air interface through which to exchange control and bearer data with WCD(s). Although only certain representative BSs are shown for each RAN, the RANs could include more BSs that cooperatively define a coverage area or multiple coverage areas.

RAN 102 and RAN 104 are communicatively coupled together through a representative intermediary such as an IWS 112 that facilitates exchange of signaling and various information between the RANs. More particularly, RAN 102 is communicatively coupled to IWS 112, and RAN 104 is also communicatively coupled to IWS 112. In practice, for instance, the base station of each RAN may be in communication with back-end network infrastructure, which may be in turn be in communication with the IWS. Thus, registration and call setup signaling could be exchanged between the RANs, to support functionality such as eCSFB for instance.

Figure 2:
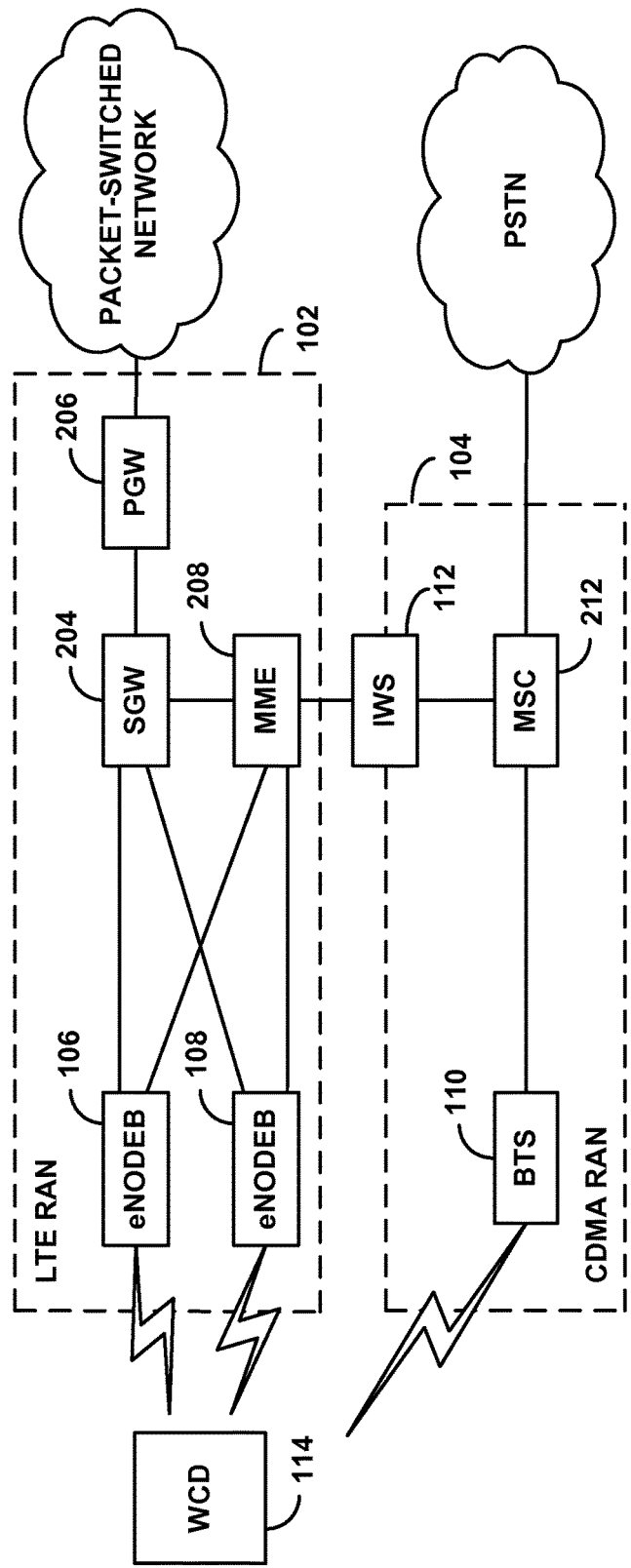
FIG. 2 is a simplified block diagram of a more specific network arrangement in which the example embodiment can be implemented.

FIG. 2 is a more specific block diagram depicting an example network arrangement like that shown in FIG. 1. In the arrangement of FIG. 2, RAN 102 is a 4G LTE network that primarily serves WCD(s) with wireless packet data communication service (including perhaps voice-over-packet and other packet-based real-time media service), and RAN 104 is a 3G CDMA network that primarily serves WCD(s) with circuit-switched voice call service (but may also provide packet-data communication service and other types of service). These networks could take other forms as well, using other protocols such as WiMAX, GSM, or others now known or later developed.

In the 4G LTE network 102 shown in FIG. 2, the representative BSs 106 and 108 are shown as eNodeBs, each with an antenna structure and associated equipment for engaging in LTE communication over the air interface with WCD(s). Each of eNodeB 106 and 108 is then shown coupled with an MME 208 that serves as a signaling controller for the LTE network. Further, each eNodeB is also shown coupled with a serving gateway (SGW) 204, which may then be coupled with a packet-gateway (PGW) 206 that connects with a packet-switched network. And the MME 208 is shown coupled with the SGW 204.

In the CDMA network 104 shown in FIG. 2, the representative BS 110 is shown as a base transceiver station (BTS), which includes an antenna structure and associated equipment for engaging in CDMA communication with WCD(s). The BTS is then shown in communication (possibly through a base station controller (BSC) (not shown)) with a mobile switching center (MSC) 212 that functions to manage paging over the CDMA air interface and to provide connectivity with the PSTN.

Further shown in FIG. 2 is the IWS 112, which functions to facilitate interworking between the LTE network 102 and the CDMA network 104 as discussed above, so as to facilitate eCSFB functionality for instance.

In practice with this LTE/CDMA arrangement, the LTE eNodeB 106 may broadcast an overhead signal such as a System Information Block #8 (SIB8) that includes data that a recipient WCD may programmatically interpret to mean that the LTE coverage area in which the overhead signal is broadcast is one that supports eCSFB functionality. Assuming the recipient WCD is capable of engaging in eCSFB, the WCD may detect this broadcast signal and may responsively opt to register in the coverage area of the LTE network. Under LTE principles, the WCD may do so by transmitting an attach request to eNodeB 106, including in the attach request data that indicates capabilities of the WCD such an indication that the UE supports eCSFB functionality. (Such functions may additionally or alternatively be carried out with respect to eNodeB 108.)

Upon receipt of this attach request, the LTE network may register a presence of the WCD in the coverage area of eNodeB 106. For instance, eNodeB 106 may signal to MME 208 to trigger this registration. Further, in response to the attach request indicating that the WCD supports eCSFB functionality, MME 208 may also signal to IWS 112 to trigger registration of the UE with the CDMA network. In particular, upon receipt of the signal from MME 208, IWS 112 may signal to MSC 212, and the MSC (in cooperation, perhaps, with a home location register and/or other network infrastructure) may register the fact that the WCD is currently served by the LTE network.

A WCD may be handed over from one wireless coverage area (e.g., a wireless coverage area provided by a "source base station" such as BS 106) to another wireless coverage area (e.g., a wireless coverage area provided by a "target base station" such as BS 108). To facilitate such a handover, among other things, a base station will typically broadcast a pilot signal in the wireless coverage area that it serves, which may enable WCDs within a given wireless coverage area to detect and evaluate the quality of various wireless coverage areas provided by various base stations. Thus, when a WCD is within a given wireless coverage area, the WCD may regularly monitor the strength (e.g., signal to noise ratio) of the pilot signal in that wireless coverage area as well as the strengths of the pilot signals in adjacent wireless coverage areas. If the pilot signal from an adjacent wireless coverage area becomes sufficiently stronger than the pilot signal from the current serving wireless coverage area (e.g., as a result of the WCD moving toward the adjacent wireless coverage area), the WCD may then request a handoff from the serving wireless coverage area (or "source base station") to the adjacent wireless coverage area (or "target base station").

Figure 3:
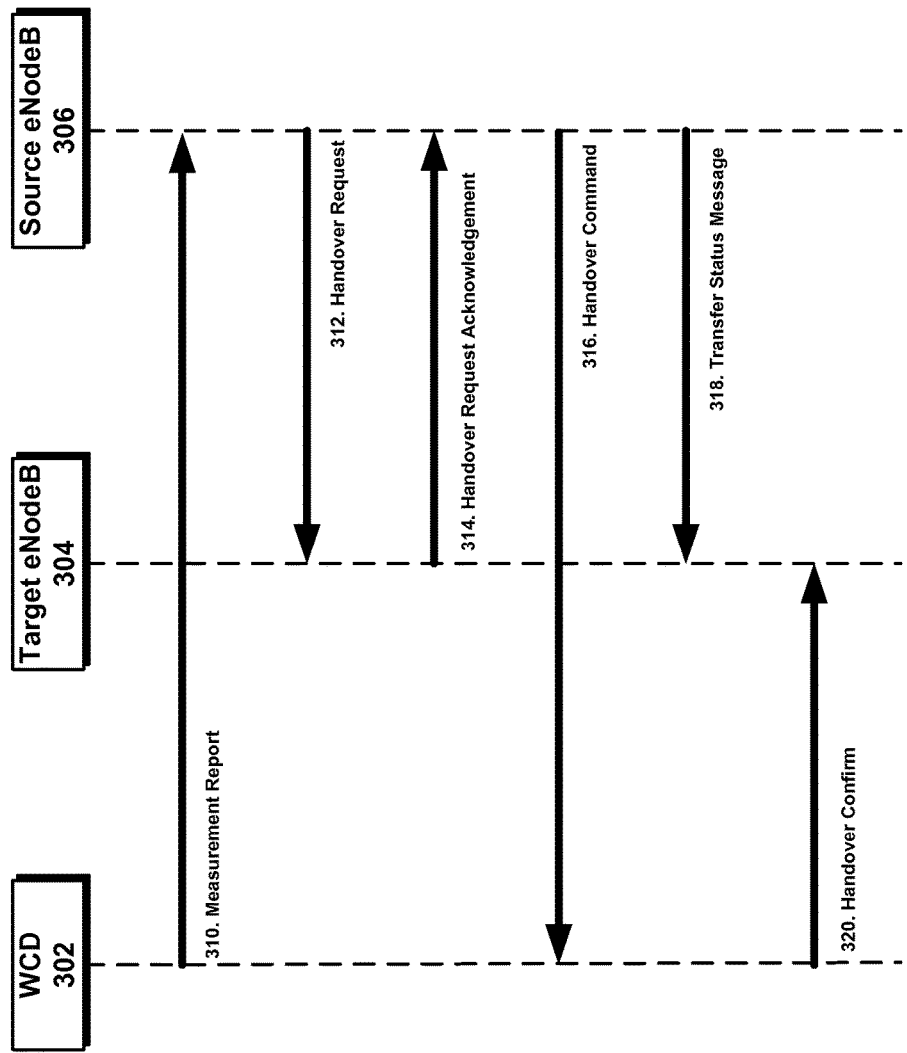
FIG. 3 is a simplified signal-flow diagram of an example handover procedure.

FIG. 3 is a simplified signal-flow diagram of an example handover procedure. The particular handover procedure depicted in FIG. 3 involves various signals sent to, from, and between, mobile device 302, Target eNodeB 304, and Source eNodeB 306. The network elements depicted in FIG. 3 may generally correspond to the respective similar network elements described above with respect to FIGS. 1 and 2. For instance, Source eNodeB 306 may be BS 106, and Target eNodeB 304 may be BS 108. However, it should be understood that the network elements shown in FIG. 3 are shown for purposes of example and explanation only, and that additional or alternative network elements may be involved in a handover procedure. Further, it should be understood that the particular messages depicted in FIG. 3 are set forth for purposes of example and explanation only and that additional and/or alternative messages may be used as well.

The handover procedure may begin, or may be otherwise initiated by a measurement report 310 sent by WCD 302 to Source eNodeB 306. Measurement report 310 may generally indicate that a pilot signal received by WCD 302 from Target eNodeB 304 is stronger than a pilot signal received from Source eNodeB 306 (among other such information). In response, Source eNodeB 306, perhaps with assistance from other network elements, may determine that handover should occur, and Source eNodeB 306 may then send to Target eNodeB 304 a handover request 312. Handover request 312 may include various information that notifies Target eNodeB 304 that Source eNodeB 306 would like to handover WCD 302 and prepares Target eNodeB 304 for handover. In response, Target eNodeB 304 may check for resource availability and, if such resources are available, may reserve such resources for providing service to WCD 302. Target eNodeB 304 may then send back to Source eNodeB 306 a handover request acknowledgement 314, which may include various information to help Source eNodeB 306 perform the handover.

After the handover request is acknowledged by Target eNodeB 304, Source eNodeB 306 may send to WCD 302 a handover command 316 to direct WCD 302 to engage in the handover. Concurrently, or subsequently, Source eNodeB 306 may also send to Target eNodeB 304 a transfer status message 318 to inform Target eNodeB 304 that WCD 302 has been directed to handover. Once WCD 302 has transitioned to service under Target eNodeB 304, WCD 302 may send to Target eNodeB 304 a handover confirm message 320, to complete the handover process.

It should be understood that, although the handover procedure described above involves base stations (i.e., eNodeBs) of a single RAN, this is not necessary. Handover may also occur between a first base station of a first network and a second base station of a second network using a procedure that is the same, or similar to, the procedure described with respect to FIG. 3.

Returning now again to FIG. 1, RAN 102 and RAN 104 may be owned and operated by the same wireless service provider, and the service provider may configure the RANs to interwork with each other (or may arrange for the IWS to associate the RANs with each other) so as to facilitate eCSFB for instance. Alternatively, the RANs may be owned and/or operated by different wireless service providers, and those service providers may have an agreement with each other to allow for interworking between the networks, again to facilitate eCSFB or the like.

In practice, RAN 102 may be configured to respond to a registration request received from a given WCD in its coverage area by not only registering the given WCD as being in that coverage area of RAN 102 but also signaling to the IWS to trigger registration of the WCD with RAN 104 as well. Further, a service provider may configure RAN 104 to receive and record such a registration and to page the given WCD for a call that will be served by RAN 104, to transmit a page message to the IWS so as to trigger paging of the given WCD by RAN 102, and to ultimately transition the WCD to take the call over the air interface provided by RAN 104. Further, the RANs may be configured in additional ways to support eCSFB or the like.

Figure 4A:
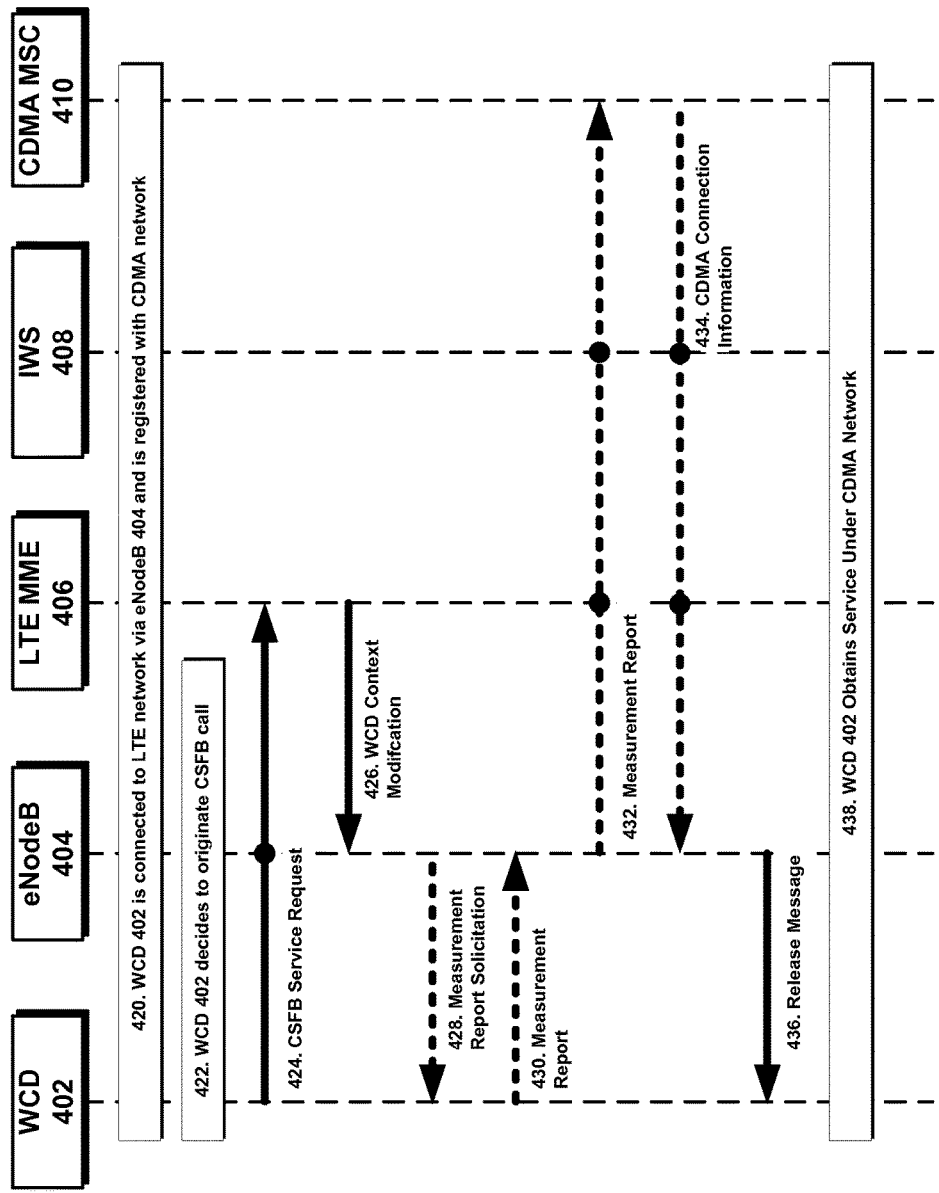
FIG. 4A is a simplified signal-flow diagram of an example fallback procedure where a call is originated from a wireless communication device.

FIG. 4A is a simplified signal-flow diagram of an example fallback procedure for setting up a eCSFB call where the call is originated from a WCD that is provided service by a given LTE network. The example fallback procedure depicted in FIG. 4A includes various functions that may be used to setup an eCSFB call. The particular fallback procedure depicted in FIG. 4A involves various signals sent to, from, and between, WCD 402, eNodeB 404, LTE MME 406, IWS 408, and CDMA MSC 410. The network elements depicted in FIG. 4A may generally correspond to the respective similar network elements described above with respect to FIGS. 1 and 2. For instance, eNodeB 404 may be BS 106, LTE MME 406 may be MME 208, IWS 408 may be IWS 112, and CDMA MSC 410 may be MSC 212. However, it should be understood that the network elements shown in FIG. 4A are shown for purposes of example and explanation only, and that additional or alternative network elements may be involved in a fallback procedure. Further, it should be understood that the particular steps and messages depicted in FIG. 4A are set forth for purposes of example and explanation only and that additional and/or alternative steeps and messages may be used as well.

The fallback procedure shown in FIG. 4A is generally initiated by WCD 402 originating a call, or otherwise making a CSFB service request. The fallback procedure may be initiated at a time when WCD 402 is provided service under an LTE network via eNodeB 404, and is also registered with a CDMA network (i.e., a CDMA network that includes CDMA MSC 410), as indicated by block 420. Then, as shown by block 422, WCD 402 may decide to originate the CSFB call.

Accordingly, WCD 402 may send to eNodeB 404 a CSFB service request 424, which eNodeB 404 may then forward to LTE MME 406. CSFB service request 424 may be any suitable communication origination request. In response to receiving CSFB Service Request 424, LTE MME 406 may then send to eNodeB 404 a WCD context modification message 426 that generally directs eNodeB 404 to cause WCD 402 to obtain service under the CDMA network.

At this point, as part of a given fallback procedure, eNodeB 404 may optionally solicit a measurement report from WCD 402 to help determine the target cell in the CDMA network to which the fallback will be performed. Thus, eNodeB 404 may send to WCD 402 a measurement report solicitation 428. In response, WCD 402 may evaluate air-interface quality of the CDMA network. For instance, WCD 402 may measure the strength of various pilot signals received from the CDMA network. Additionally, WCD 402 may measure air-interface conditions of various frequencies and/or channels provided by the CDMA network. Once the evaluation of air-interface quality is performed, WCD 402 may then send a measurement report 430 to eNodeB 404, and that report may contain an indication of the measured air-interface quality of the CDMA network.

Once eNodeB 404 receives measurement report 430, it may forward an indication of the air-interface quality as a measurement report 432 to CDMA MSC 410 via LTE MME 406 and IWS 408. CDMA MSC 410 may then evaluate measurement report 432 and, based on the evaluation, allocate various resources for the CSFB call. For instance, CDMA MSC 410 may allocate a given frequency and/or channel provided by the CDMA network for the CSFB call, based on an indication in the measurement report that there exists a relatively high-quality air interface with WCD 402 on that given frequency and/or channel.

CDMA MSC 410 may then send a CDMA connection information message 434 back to eNodeB 404 via IWS 408 and LTE MME 406, where CDMA connection information message 434 includes an indication of the allocated frequency and/or channel. In turn, eNodeB 404 may then send to WCD 402 a release message 436, directing WCD 402 to obtain service under the CDMA network using the allocated frequency and/or channel. As shown by block 438, WCD 402 may then obtain service under the CDMA network.

Figure 4B:
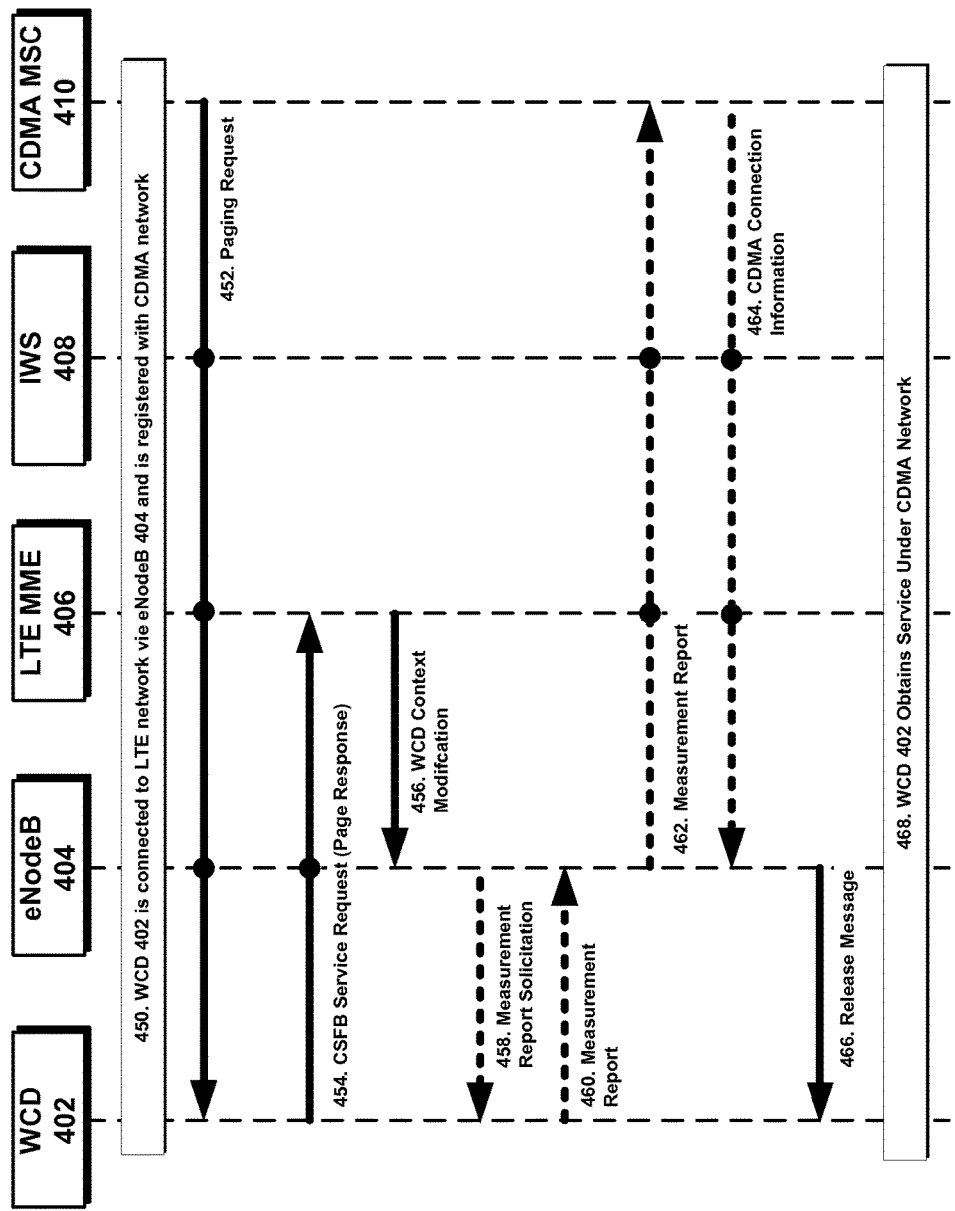
FIG. 4B is a simplified signal-flow diagram of an example fallback procedure where a call is originated from remote location.

FIG. 4B is a simplified signal-flow diagram of an example fallback procedure where a call is originated from a location that is remote from WCD 402. The example fallback procedure depicted in FIG. 4B includes various functions that may be used to setup an eCSFB call. Like FIG. 4A, the particular fallback procedure depicted in FIG. 4B involves various signals sent to, from, and between, WCD 402, eNodeB 404, LTE MME 406, IWS 408, and CDMA MSC 410. However, it should be understood that the network elements shown in FIG. 4B are shown for purposes of example and explanation only, and that additional or alternative network elements may be involved in a fallback procedure. Further, it should be understood that the particular messages depicted in FIG. 4B are set forth for purposes of example and explanation only and that additional and/or alternative messages may be used as well.

The fallback procedure shown in FIG. 4B is generally initiated by a network entity that is remote from WCD 402, possibly where the remote network entity is provided service under a RAN different from the RAN by which eNodeB 404 is provided service. For instance, the remote network entity may originate a voice call to WCD 402 from another network providing access to the PSTN.

The fallback procedure may generally be carried out when WCD 402 is connected to an LTE network via eNodeB 404, and is also registered with a CDMA network (i.e., a CDMA network that includes CDMA MSC 410), as indicated by block 450. The remote network entity may then originate the voice call to WCD 402 by sending a call origination request that is eventually delivered to CDMA MSC 410. In response, CDMA MSC 410 may send a paging request 452 to WCD 402 via IWS 408, LTE MME 406, and eNodeB 404. WCD 402 may then send a response to the paging request in the form of a CSFB service request 454. From that point, the handover procedure may proceed with messages 456-466 that are similar to messages 426-436. As shown by block 468, WCD 402 may then obtain service under the CDMA network to carry out the call that was originated from the remote location.

The various signaling described above with respect to FIGS. 4A and 4B that is involved in setting up the eCSFB call may be interrupted or otherwise disrupted if, during setup of the eCSFB call, the WCD initiates a handover procedure (such as that described with respect to FIG. 3) to handover from being served by the first base station to be served by a second base station. For instance, if WCD 402 initiates a handover procedure before eNodeB 404 provides a release message, it may become inefficient, difficult, or even impossible under available procedures, for the first network to cause WCD 402 to setup the eCSFB call. As a result, setup of the eCSFB call may fail.

Figure 5:
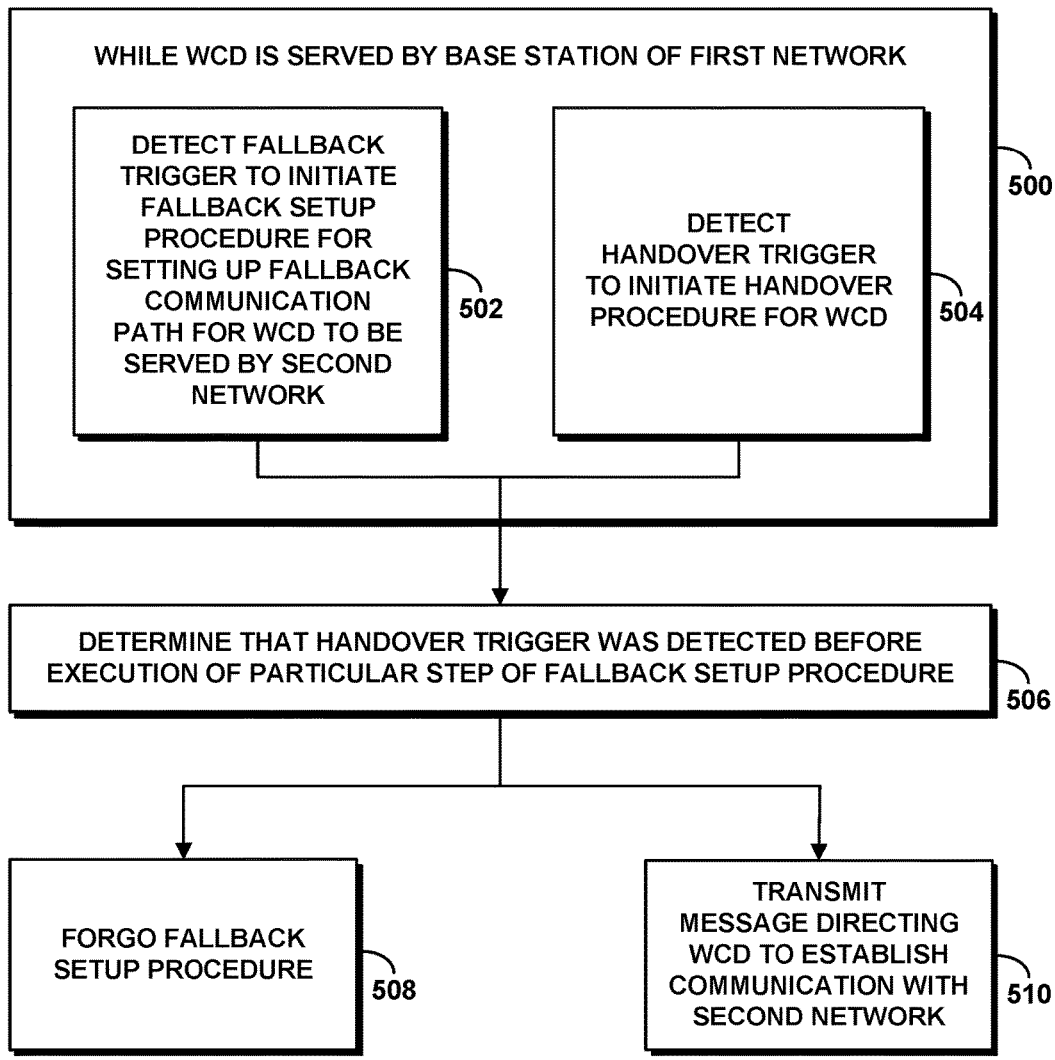
FIG. 5 is a flow chart depicting functions that can be carried out in accordance with an example method.

FIG. 5 is next a flow chart depicting functions that a representative network node, such as eNobeB 106, can carry out to facilitate a successful setup of an eCSFB call even in the presence of handover. In accordance with the method, a given WCD may be initially registered with RAN 102 (e.g., an LTE network), and eNobeB 106 may detect both a fallback trigger to initiate a fallback setup procedure and a handover trigger to initiate a handover procedure. In such a situation, to help facilitate successful setup of the eCSFB call, eNodeB 106 may forgo a predetermined fallback setup procedure (such as one of the example fallback setup procedures discussed above with respect to FIGS. 4A and 4B), and may instead proceed to direct the WCD to establish communication with the fallback network without completing the predetermined fallback setup procedure.

As shown in FIG. 5, at block 500, the method involves, while a WCD is being served by a base station of a first network, detecting by the base station of the first network certain triggers. At block 502, the base station detects a fallback trigger to initiate a fallback setup procedure for setting up a fallback communication path for the WCD to be served by a second network, where the fallback setup procedure involves execution of a sequence of steps, the sequence of steps including a particular step. And at block 504, the base station detects a handover trigger to initiate a handover procedure for the WCD. At block 506, the method then involves determining by the base station of the first network that the handover trigger was detected before execution of the particular step of the fallback setup procedure. At block 508, responsive to determining that the handover trigger was detected before execution of the particular step, the base station of the first network forgoes the fallback setup procedure. Additionally, at block 510, responsive to determining that the handover trigger was detected before execution of the particular step, the base station of the first network also transmits to the WCD a message directing the WCD to establish communication with the second network. Various functions associated with these representative blocks of FIG. 5 are further explained below.

As noted, at block 500, the method involves, while a WCD is being served by a base station of a first network, detecting by the base station of the first network certain triggers. In accordance with block 500, the WCD may be served by any suitable base station of any suitable network. The base station may be, for example BS 106 of RAN 102 as depicted in FIG. 1. Alternatively, the base station may be, for example, eNobeB 106 as depicted in FIG. 2, and the first network may be an LTE network. The WCD may be WCD 114 shown in both FIG. 1 and FIG. 2. Other examples of suitable WCDs, base stations, and networks may exist.

One trigger that may be detected by the base station of the first network is represented in FIG. 5 by block 502. More particularly, at block 502, the base station detects a fallback trigger to initiate a fallback setup procedure for setting up a fallback communication path for the WCD to be served by a second network. The fallback setup procedure involves execution of a sequence of steps including a particular step.

In accordance with block 502, the fallback trigger to initiate the fallback setup procedure for setting up a fallback communication path may be any suitable fallback trigger. As one example, the fallback trigger may be a call origination request sent by a WCD to the base station of the first network. Such a call origination request may be similar to CSFB service request 424, as discussed above with respect to FIG. 4A. Thus, in the case where the fallback communication path is a CSFB communication path, detecting the fallback trigger to setup the CSFB communication path may involve receiving by the base station of the first network from the WCD a CSFB origination message.

As another example, the fallback trigger may correspond to a paging request for a call that is originated by a network device that is remote to the WCD. Such a paging request may be similar to paging request 452 sent by CDMA MSC 410 to WCD 402 via eNodeB 404, as discussed above with respect to FIG. 4B. Alternatively, the fallback trigger may be a response to paging request 452 sent by WCD 402 to eNodeB 404, such as CSFB service request (or page response) 424, as discussed above with respect to FIG. 4B. Thus, in the case where the fallback communication path is a CSFB communication path, detecting the trigger to setup the CSFB communication path may involve receiving by the base station of the first network from the WCD a CSFB page-response message.

While particular examples of fallback triggers are discussed above, it should be understood that other examples of such fallback triggers may exist. Furthermore, while the particular examples of fallback triggers discussed above generally correspond to functions carried out relatively early in a fallback setup procedure, this is not necessary. The fallback trigger may generally be any function performed during the fallback setup procedure including, but not limited to, any of those functions discussed above with respect to FIG. 4A and FIG. 4B. As a general matter, however, the fallback trigger will occur prior to the particular step of the fallback setup procedure, as discussed further below.

As noted, in accordance with block 502, the fallback setup procedure may involve execution of a sequence of steps. Such a sequence of steps may be any suitable sequence of steps executed by various network entities to establish the fallback communication path. Further, such a sequence of steps may involve transmission and/or receipt of various messages or signals between the network entities to convey information required to establish the fallback communication path. The sequence of steps of the fallback setup procedure may include any of those steps discussed above with respect to FIG. 4A and FIG. 4B. However, the sequence of steps may include alternative and/or additional steps as well.

As also noted, the sequence of steps may include a particular step. As further discussed below in connection with block 506, the method may involve determining that the handover trigger detected in accordance with block 504 was detected before execution of the particular step of the fallback setup procedure. Accordingly, the particular step may generally be any step for which it may be preferable, desirable, and/or otherwise decided to not let the fallback setup procedure advance past in the presence of handover (i.e., when the base station has detected a handover trigger).

In an embodiment, the particular step of the sequence of steps may be transmitting by the base station in the first network to the WCD a direction that the WCD evaluate air-interface quality of the second network. For instance, the particular step may be the transmission of measurement report solicitation 428 by eNodeB 404 to WCD 402, as discussed above in connection with FIG. 4A and FIG. 4B.

In another embodiment, the particular step of the sequence of steps may be receiving by the base station in the first network from the WCD a message that contains an indication of air-interface quality of the second network. For instance, the particular step may be the receipt of measurement report 430 by eNodeB 404 from WCD 402, as discussed above in connection with FIG. 4A and FIG. 4B.

In yet another embodiment, the particular step of the sequence of steps may be transmitting by the base station in the first network to the second network an indication of air-interface quality of the second network as measured by the WCD. For instance, the particular step may be the transmission of measurement report 432 by eNobeB 404 to CDMA MSC 410 via LTE MME 406 and IWS 408, as discussed above in connection with FIG. 4A and FIG. 4B. Thus, more particularly, transmitting by the base station in the first network to the second network the indication of air-interface quality of the second network may involve transmitting by the base station in the first network to a MSC in the second network the indication of air-interface quality of the second network.

While some examples of the particular step in a call setup procedure referred to in block 502 are discussed above, it should be understood that this is for purposes of example and explanation only. Other particular steps may be identified and/or used in accordance with the example method, including block 502, described herein.

Another trigger that may be detected by the base station of the first network is represented in FIG. 5 by block 504. More particularly, at block 504, the base station detects a handover trigger to initiate a handover procedure for the WCD.

In accordance with block 504, the handover trigger to initiate the handover procedure for the WCD may be any suitable handover trigger. As a general matter, the handover trigger may be any step of a handover process that generally corresponds to initiation of a handover condition. As one example, the handover trigger may be the base station (i.e., a source base station) receiving from the target base station an acknowledgement that the WCD may be handed over to the target base station. For instance, the handover trigger may be similar to handover request acknowledgement 314 received by Source eNodeB 306 from Target eNodeB 304, as discussed above with respect to FIG. 3. Thus, the handover trigger may include receiving from a target base station a handover-request-acknowledgement message.

While an example of the handover trigger is discussed above, it should be understood that this is for purposes of example and explanation only. Other particular handover triggers may be identified and/or used in accordance with the example method, including block 504, described herein.

Now, with reference to block 506, the method involves determining by the base station of the first network that the handover trigger was detected before execution of the particular step of the fallback setup procedure.

In accordance with block 506, the fallback setup procedure may have been initiated before receiving the handover trigger. Alternatively, the fallback setup procedure may not have been initiated at the time the handover trigger is received. In the case where the fallback procedure has not been initiated at the time the handover trigger is received, the fallback trigger may have been received after the handover trigger is received. In such a case, determining that the handover trigger was detected before execution of the particular step of the fallback setup procedure may involve generally determining that the handover trigger was detected before detection of the fallback trigger. In this case, it is clear that the handover trigger was detected before execution of the particular step of the fallback setup procedure because the fallback setup procedure was not even initiated at the time of receiving the handover trigger.

In the alternative case where the fallback procedure has been initiated before the handover trigger is received (e.g., in a situation where the fallback trigger is received before receiving the handover trigger), it may be necessary for the base station to more specifically determine whether the particular step of the fallback setup procedure has yet been executed at the time of receipt of the handover trigger. As such, determining that the handover trigger was detected before execution of the particular step of the fallback setup procedure may involve determining that, when the handover trigger was received, the fallback setup procedure had been initiated but the particular step had not been executed.

Alternatively and/or additionally, determining that the handover trigger was detected before execution of the particular step of the fallback setup procedure may involve an evaluation of an amount of time that elapsed between detection of the handover trigger and detection of the fallback trigger. For instance, if the handover trigger is received within a predetermined amount of time after detection of the fallback trigger, than the base station may be configured to presume that the particular step of the fallback setup procedure has not yet been executed at the time of detection of the handover trigger. Thus, determining that the handover trigger was detected before execution of the particular step of the fallback setup procedure may involve determining that the handover trigger was detected before a predetermined amount of time after detection of the fallback trigger had elapsed.

While particular examples of determining that the handover trigger was detected before execution of the particular step of the fallback setup procedure are discussed above, it should be understood that this is for purposes of example and explanation only. Other examples may exist.

Now, with reference to block 508, the method involves, responsive to determining that the handover trigger was detected before execution of the particular step, the base station of the first network forgoing the fallback setup procedure. In accordance with block 508, the base station may generally forgo the fallback setup procedure in response to determining that the fallback setup procedure has not advanced beyond a given point (i.e., that the particular step has not been executed).

As noted above in connection with the discussion of block 506, determining that the handover trigger was detected before execution of the particular step may involve determining that the handover trigger was detected before initiation of the fallback setup procedure. In such a situation, forgoing the fallback setup procedure in accordance with block 508 may involve not initiating the fallback setup procedure. Thus, where the fallback setup procedure has not yet been initiated at the time the handover trigger is detected, the fallback setup procedure may not be initiated at all.

As also noted above in connection with the discussion of block 506, it is possible that the base station of the first network may initiate the fallback setup procedure before detecting the handover trigger. In such a situation, forgoing the fallback setup procedure in accordance with block 508 may involve terminating the fallback setup procedure that was previously initiated. The base station may generally not execute any additional steps of the fallback setup procedure once the fallback setup procedure has been terminated.

Now, with reference to block 510, the method involves, responsive to determining that the handover trigger was detected before execution of the particular step, the base station of the first network transmitting to the WCD a message directing the WCD to establish communication with the second network. It should be understood that block 510 may be executed before, after, or concurrent with block 508.

In an embodiment, the message directing the WCD to establish communication with the second network may indicate a predetermined target frequency and a predetermined target channel for use in establishing communication with the second network. In such an embodiment, the predetermined target frequency and predetermined target channel will have been identified prior to detection of the handover trigger and/or the fallback trigger.

Such a predetermined target frequency and/or predetermined target channel may be a default frequency and/or default channel. The default frequency and/or default channel may be identified or designated by an operator of the communication system, and the base station may be configured to store such a default frequency and/or default channel in data storage for retrieval. Such default frequency and/or default channel information may be referred to as "release-and-redirect data."

Thus, in accordance with such an embodiment, before detecting the fallback trigger, the base station may store in data storage of the first base station release-and-redirect data that indicates the predetermined target frequency and the predetermined target channel. Such release-and-redirect data may then be accessed in accordance with block 510, and used by the base station to direct the WCD to establish communication with the second network using the predetermined target frequency and the predetermined target channel.

It should be understood, however, that the message directing the WCD to establish communication with the second network need not necessarily indicate any such target frequency and/or target channel. Instead, the message directing the WCD to establish communication with the second network may generally direct the WCD to obtain connectivity with the second network. The WCD may then use typical registration procedures to obtain such connectivity, including obtaining necessary information such as frequency and/or channel information from the second network itself.

Figure 6:
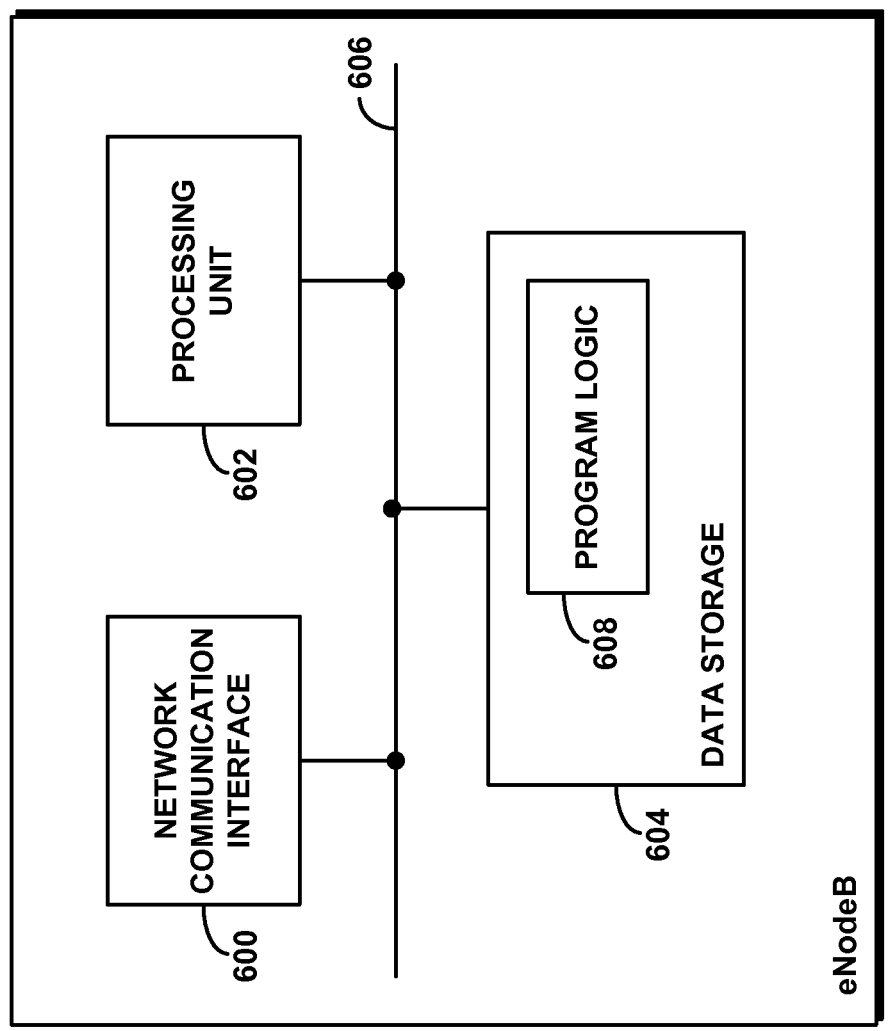
FIG. 6 is a simplified block diagram of a network node arranged to carry out various functions in accordance with an example embodiment.

FIG. 6 is a simplified block diagram of a network node, such as base station 106, that may be configured to carry out the example method described above. As shown, the example network node includes a network communication interface 600, a processing unit 602, and non-transitory data storage 604, all of which may be coupled together by a system bus, network, or other connection mechanism 606.

Network communication interface 600 functions to facilitate communication with other entities, such as MME 208 and/or MSC 212, among other examples. As such, the network communication interface may comprise multiple network interface modules, such as Ethernet modules for instance, or may take any of a variety of other forms, supporting wireless and/or wired network communication.

Processing unit 602 may include one or more general purpose processors (such as microprocessors) and/or one or more special purpose processors (e.g., application specific integrated circuits). And data storage 604 may comprise one or more volatile and/or non-volatile storage components, such as optical, magnetic, or flash storage, and may be integrated in whole or in part with processing unit 602.

As shown, data storage 604 may hold program logic 608 (or program instructions) that are executable or interpretable by processing unit 602 to carry out various functions described herein. For instance, the program instructions may cause the processing unit, and thus a base station of a first network to, (i) while a WCD is being served by the base station, detect (a) a fallback trigger to initiate a fallback setup procedure for setting up a fallback communication path for the WCD to be served by a second network, where the fallback setup procedure involves execution of a sequence of steps, the sequence of steps including a particular step, and (b) a handover trigger to initiate a handover procedure for the WCD, (ii) determine that the handover trigger was detected before execution of the particular step of the fallback setup procedure, and (iii) responsive to determining that the handover trigger was detected before execution of the particular step, (a) forgo the fallback setup procedure and (b) transmit to the WCD a message directing the WCD to establish communication with the second network.

Example embodiments have been described above. It should be understood, however, that variations from these embodiments are possible, while remaining within the true spirit and scope of the invention.

We claim:

1. A method comprising:
    while a wireless communication device (WCD) is being served by a base station of a first network, detecting by the base station of the first network:
        (a) a fallback trigger to initiate a fallback setup procedure for setting up a fallback communication path for the WCD to be served by a second network, wherein the fallback setup procedure involves execution of a sequence of steps, the sequence of steps including a particular step, and
        (b) a handover trigger to initiate a handover procedure for the WCD, wherein the handover procedure is between base stations of the first network;
    determining by the base station of the first network that the handover trigger was detected before execution of the particular step of the fallback setup procedure; and
    responsive to determining that the handover trigger was detected before execution of the particular step, the base station of the first network (a) forgoing the fallback setup procedure and (b) transmitting to the WCD a message directing the WCD to establish communication with the second network.

2. The method of claim 1, further comprising:
    the base station of the first network initiating the fallback setup procedure before detecting the handover trigger, wherein forgoing the fallback setup procedure comprises terminating the fallback setup procedure.

3. The method of claim 1, wherein determining that the handover trigger was detected before execution of the particular step comprises determining that the handover trigger was detected before initiation of the fallback setup procedure, and wherein forgoing the fallback setup procedure comprises not initiating the fallback setup procedure.

4. The method of claim 1, wherein the message directing the WCD to establish communication with the second network indicates a predetermined target frequency and a predetermined target channel.

5. The method of claim 4, the method further comprising:
    before detecting the fallback trigger, storing in data storage of the first base station release-and-redirect data that indicates the predetermined target frequency and the predetermined target channel.

6. The method of claim 1, wherein determining that the handover trigger was detected before execution of the particular step comprises at least one of:
   (a) determining that the handover trigger was detected before a predetermined amount of time after detection of the fallback trigger had elapsed,
   (b) determining that the handover trigger was detected before detection of the fallback trigger, or
   (c) determining that, when the handover trigger was detected, the fallback setup procedure had been initiated but the particular step had not been executed.

7. The method of claim 1, wherein the particular step is at least one of:
   (a) transmitting by the base station in the first network to the WCD a direction that the WCD evaluate air-interface quality of the second network,
   (b) receiving by the base station in the first network from the WCD a message that contains an indication of air-interface quality of the second network, or
   (c) transmitting by the base station in the first network to the second network an indication of air-interface quality of the second network as measured by the WCD.

8. The method of claim 7, wherein transmitting by the base station in the first network to the second network the indication of air-interface quality of the second network comprises transmitting by the base station in the first network to a mobile switching center (MSC) in the second network the indication of air-interface quality of the second network.

9. The method of claim 1, wherein the handover trigger comprises receiving from a target base station a handover-request-acknowledgement message.

10. The method of claim 1, wherein the fallback communication path is a circuit switched fallback (CSFB) communication path, wherein detecting the trigger to initiate the fallback setup procedure for setting up the CSFB communication path comprises receiving by the base station of the first network from the WCD a CSFB page-response message.

11. The method of claim 1, wherein the fallback communication path is a circuit switched fallback (CSFB) communication path, wherein detecting the fallback trigger to setup the CSFB communication path comprises receiving by the base station of the first network from the WCD a CSFB origination message.

12. The method of claim 1, wherein the first network is a Long Term Evolution (LTE) network, and wherein the fallback communication path is a circuit switched fallback (CSFB) communication path.

13. The method of claim 12, wherein the second network is selected from the group consisting of a Code Division Multiple Access (CDMA) network and a Global System for Mobile Communications (GSM) network.

14. A base station comprising:
   at least one network communication interface;
   a processor; and
   non-transitory data storage holding program instructions executable by the processor for causing the base station to carry out functions including:
      while the base station operates as a base station of a first network and serves a wireless communication device (WCD), detecting:
         (a) a fallback trigger to initiate a fallback setup procedure for setting up a fallback communication path for the WCD to be served by a second network, wherein the fallback setup procedure involves execution of a sequence of steps, the sequence of steps including a particular step, and
         (b) a handover trigger to initiate a handover procedure for the WCD, wherein the handover procedure is between base stations of the first network;
      determining that the handover trigger was detected before execution of the particular step of the fallback setup procedure; and
      responsive to the determining that the handover trigger was detected before execution of the particular step, the base station of the first network (i) forgoing the fallback setup procedure and (ii) transmitting to the WCD a message directing the WCD to establish communication with the second network.

15. The base station of claim 14, wherein the non-transitory data storage further comprises program instructions executable by the processor for causing the base station to carry out functions including:
   initiating the fallback setup procedure before detecting the handover trigger, wherein forgoing the fallback setup procedure comprises terminating the fallback setup procedure.

16. The base station of claim 14, wherein determining that the handover trigger was detected before execution of the particular step comprises determining that the handover trigger was detected before initiation of the fallback setup procedure, and wherein forgoing the fallback setup procedure comprises not initiating the fallback setup procedure.

17. The base station of claim 14, wherein the message directing the WCD to establish communication with the second network indicates a predetermined target frequency and a predetermined target channel.

18. The base station of claim 14, wherein determining that the handover trigger was detected before execution of the particular step comprises at least one of:
   (a) determining that the handover trigger was detected before a predetermined amount of time after detection of the fallback trigger had elapsed,
   (b) determining that the handover trigger was detected before detection of the fallback trigger, or
   (c) determining that, when the handover trigger was detected, the fallback setup procedure had been initiated but the particular step had not been executed.

19. The base station of claim 14, wherein the particular step is at least one of:
   (a) transmitting by the base station in the first network to the WCD a direction that the WCD evaluate air-interface quality of the second network,
   (b) receiving by the base station in the first network from the WCD a message that contains an indication of air-interface quality of the second network, or
   (c) transmitting by the base station in the first network to the second network an indication of air-interface quality of the second network as measured by the WCD.

20. The base station of claim 14, wherein the handover trigger comprises receiving from a target base station a handover-request-acknowledgement message.

* * * * *